Jan. 27, 1959  G. A. BOUVIER  2,871,382
ELECTROMECHANICAL ACTUATOR

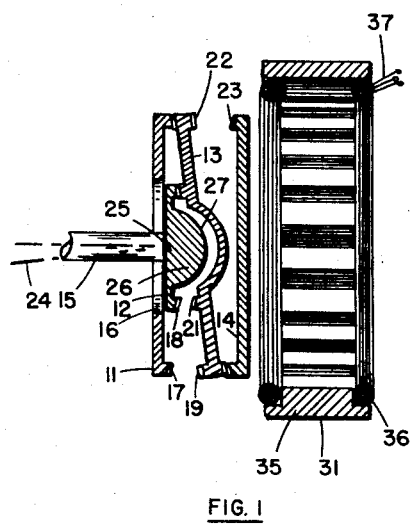

Filed May 17, 1956  3 Sheets-Sheet 2

INVENTOR.
GEORGE A. BOUVIER
BY
William R. Lem
ATTORNEY

Jan. 27, 1959  G. A. BOUVIER  2,871,382
ELECTROMECHANICAL ACTUATOR

Filed May 17, 1956  3 Sheets-Sheet 3

INVENTOR.
GEORGE A. BOUVIER
BY
William R. Lane
ATTORNEY

United States Patent Office 2,871,382
Patented Jan. 27, 1959

2,871,382

ELECTROMECHANICAL ACTUATOR

George A. Bouvier, Sierra Madre, Calif., assignor to North American Aviation, Inc.

Application May 17, 1956, Serial No. 585,443

7 Claims. (Cl. 310—82)

This invention relates to a low speed actuator and speed reducer.

It is an object of the invention to provide an improved, precise, durable and compact speed reducer with few moving parts for accomplishing great reduction of speed or a large ratio between an alternating current frequency and a mechanical output speed. Moreover, it is an object to provide such apparatus which may be constructed in units which are small and light in relation to the power transmitted.

In conventional gear trains the presence of backlash effects interferes with the constancy of the maintenance of the relationship between input and output members. In some types of precise mechanisms or fast acting control apparatus, for example, servomechanism for flight control or precision follow-up devices, even the most minute backlash in mechanical connections introduces defective operation, such as hunting, overshoot, lagging response or other faults which cannot be tolerated in such apparatus. Moreover, in gear trains having long or numerous shafts there is the tendency for a "wind-up" effect to result from the twisting torque in the shafts and the bending effect in the fulcrum arms of the gears, which also interferes with the maintenance of a fixed or precise relationship between the angular positions of the input and output members and interferes with proper operation of servomechanism.

In an apparatus where output shafts must be moved in response to relatively small input forces and with relatively little difference in effect of a given force whether applied at standstill or after acceleration, the inertia and static friction effects of heavy or bulky units become important.

It is, accordingly, an object of the invention to avoid deleterious effects and substantially overcome backlash and wind-up as well as to render inertia and static friction effects insignificant.

Other and further objects, features and advantages of the invention will become apparent as the description proceeds.

In carrying out the invention in accordance with a preferred form thereof, a normally stationary, or anchor gear and a rotatable, or terminal, gear are mounted coaxially with concentric rows of gear teeth. A wobble gear is provided having two rows of concentric gear teeth, one of which is adapted to mate with the teeth of the anchor gear and the other with the teeth of the terminal gear. A suitable mounting is provided for the wobble gear which causes it to remain tilted with its axis intersecting the axis of the terminal gear and the anchor gear and which causes it to nutate around the point of intersection of the axes, with the wobble gear teeth always in mesh at some point with the teeth in the terminal gear and the anchor gear. Mechanism is provided to drive the wobble gear in its motion of nutation. The number of teeth in one of the gears is made slightly different from the number of teeth in the gear meshing therewith. Consequently, the wobble gear gains or loses as the case may be a minute fraction of a revolution for each nutation, or relative motion between the wobble gear and the terminal gear is a small fraction of a revolution for each nutation of the wobble gear. When a very large speed reduction ratio is desired the number of teeth in each row of teeth of the wobble gear is made slightly different from the number of teeth in the gear meshing with it. In this case, not only does the wobble gear make a minute fraction of a revolution for each nutation but also the terminal gear makes a minute fraction of a revolution relative to the wobble gear for each nutation. The differences in gear teeth are made such that the two fractional rotational effects are opposite and the differential effect results in a still further great reduction in the ratio between the rotational speed of the mechanism driving the wobble gear and the terminal gear.

A better understanding of the invention will be afforded by the following detailed description considered in conjunction with the accompanying drawings in which Fig. 1 is a longitudinal sectional view of a nutation geared actuator constituting an embodiment of the invention;

Fig. 2 is an exploded view of the apparatus of Fig. 1;

Fig. 3 is a view of a section of the apparatus of Figs. 1 and 2 cut by a plane 3—3 indicated in Fig. 2;

Fig. 4 is a similar fragmentary view of a section cut by a plane 4—4;

Fig. 5 is a view, looking in the opposite direction, of a section represented as cut by plane 5—5 indicated in Fig. 2;

Figure 9:
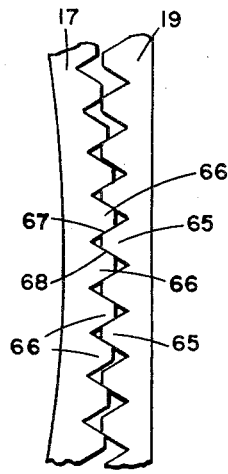

And Fig. 9 is a fragmentary diagram illustrating the precise tooth contact obtained.

Like reference characters are utilized throughout the drawing to designate like parts.

In the form of the apparatus illustrated in Figs. 1-5 there is a normally stationary or fixed anchor gear 11, secured to a fixed apparatus (not shown), a rotatable terminal gear 12, a wobble gear 13 and, if desired, also a conjugate fixed anchor gear 14. The terminal gear 12 is carried by a rotatable shaft 15 serving as the output shaft of the apparatus and mounted in a suitable bearing (not shown). The anchor gear 11 has an open center 16 to permit the terminal gear shaft 15 to extend therethrough and preferably large enough, for the sake of axial compactness, to receive the terminal gear 12. The anchor gear 11 has a row of teeth 17 slightly bevelled, and likewise the terminal gear 12 has a row of teeth 18 slightly bevelled in order that the rows of teeth 17 and 18 may mesh with corresponding concentric rows of teeth 19 and 21 of the wobble gear 13. If the conjugate gear 14 is employed the wobble gear 13 also has a back row of teeth 22 adapted to mesh with conjugate anchor gear teeth 23.

A suitable mounting arrangement is provided for the wobble gear 13 so that its axis 24 will precess or nutate around a center point 25 which lies within the axis of rotation of the terminal gear 12 and which is also within the axis of the anchor gears 11 and 14.

In the form of apparatus illustrated in Figs. 1 and 2, the desired nutation of the wobble gear 13 is accomplished by forming the terminal gear 12 with a center support 26 having a hemispherical surface 27 adapted to receive a hemispherical surface socket 28 of substantially the same radius of curvature as the surface 27, the socket 28 being formed in the wobble gear 13 and the point 25 constituting the center of curvature of the surfaces 27 and 28. The rows of teeth 17 and 18 on the anchor gear 11 and the terminal gear 12, respectively, are so located with respect to the rows of teeth 19 and 21 of the wobble gear 13 that the rows of teeth 17 and 19 will be in engagement at some point of the periphery when the corresponding rows of teeth 18 and 21 are likewise in engagement at the same position.

Suitable means are provided for constantly pressing some portion of the periphery of the wobble gear 13 firmly against the rows of gear teeth 17 and 18 of the anchor gear 11 and terminal gear 12, respectively, and simultaneously producing the motion of nutation. This may be done electrically or mechanically by one of several mechanisms most suitable for the application in question, such as cams, ball and socket drive, bearing drive, solenoids, stator type poles, etc. It is to be understood that the invention does not exclude the use of any of such forms of drive or actuation. For the sake of illustration, in the embodiment of Figs. 1–5, the drive and means for pressing wobble gear against anchor and terminal gears comprises dynamoelectric translating device in the form of a polyphase electrical field structure 31, and a polarized armature secured to or integral with the wobble gear 13.

As illustrated in Fig. 5, the web portion 32 of the wobble gear 13 is formed of a high coercive force permanent magnet material, such as an alloy of aluminum, nickel and cobalt, for example, sold under the trade name of Alnico. The permanent magnet web is radially magnetized with a center 33 of one polarity, for example, north polarity, and a periphery 34 of an opposite polarity, for example, south polarity. The field structure 31 is shown, by way of example, as taking the form of a conventional laminated-steel toothed core 35 and a winding structure 36 with a plurality of terminals 37, shown in Fig. 1. The winding structure 36, as illustrated, constitutes a conventional polyphase alternating-current winding with a pitch of approximately 180° so as to form a two pole winding. For simplicity, in the electrical connections, the winding structure is either a two or three phase winding, preferably three phase, in view of the greater availability of three phase apparatus for cooperating therewith. It will be understood that the invention is not limited to use of alternating-current excitation and does not exclude the use of pulsating direct current or intermittent electrical impulses of various kinds.

As shown in Fig. 1, the polyphase field structure 31 is displaced axially from an average position of the permanently magnetized web 32 so that the magnetic field of the field structure 31 will react with the permanent magnet field of the permanently magnetized web 32 to press one edge of the wobble gear 13 against the anchor gear 17 and the terminal gear teeth 18, with the opposite edge being pressed against the anchor gear 14 to balance the forces and render it unnecessary to permit the surface 28 to come in contact with the surface 27, thereby overcoming static friction and permitting the surfaces 27 and 28 to serve merely as limit guides for use when the field structure 31 is not energized. However, owing to the fact that only small movement of the wobble gear 13 takes place, contact between the surfaces 27 and 28 introduces insignificant static friction in any case. For the sake of simplicity, and in order to render the structure still more compact, the conjugate anchor gear 14 may be omitted.

It will be understood by those skilled in the art that when polyphase windings are energized from a source of polyphase alternating current, a rotating field is produced which, in the case of a two pole winding rotates around the center axis of the field at the same rate as the frequency of the energizing alternating-current source.

Since this field is transverse, of north polarity at one edge of the field structure 31 and of south polarity of the opposite edge, a force of attraction will take place at one end of a diameter of instantaneous magnetization of the field and a force of repulsion will take place at the opposite end. This will cause one edge of the wobble gear to be pressed toward an edge of the anchor gear 17 and the opposite edge of the wobble gear 13 at the end of the same diameter to be pressed against the conjugate anchor gear 14. Thus firm engagement of each gear tooth on each side with the surfaces of mating gear teeth is accomplished without any mechanical or friction-possession means and backlash is avoided.

In this way, the teeth 19 are constantly being driven into mesh with the teeth 17 with both sides of the teeth in contact, and likewise, the teeth 21 are driven against the teeth 18 with both sides of the teeth in contact so that there can be no backlash. Since the wobble gear 13 and the terminal gear 26 are the only moving parts and they are very light and, moreover, travel at very low speeds, inertia effects are infinitesimal. Moreover, since there are no interposed shafts and no trains of gears, wind-up effects are avoided. As already explained, static friction is infinitesimal but such static friction as takes place is not such as to affect the accuracy of the motion of the apparatus or the speed of response.

The advantages of firm engagement between the teeth of adjacent gears, as accomplished by the invention, are illustrated in Fig. 9. It is to be observed that each gear tooth 65 is pressed closely between the gear teeth 66 of the adjacent gear, with the gear tooth 65 in direct contact at the points 67 and 68 with the gear teeth 66 so that no backlash can occur.

Since it is feasible to make the teeth relatively fine with the number of teeth in the anchor gear 17 of the order of two hundred or more, and the number of teeth in the row 19 of the wobble gear 13 one more or less, it will be apparent that for each nutation of the gear 13 the relative rotary motion with respect to the axis of the shaft 15 of the wobble gear and the anchor gear is a very minute fraction of a revolution of each cycle of the polyphase alternating current applied to the terminals 37, or for each electrical impulse in case some other type of electrical excitation is employed. The relative rotation of the terminal gear 12 and the wobble gear 13 for each nutation is also a very minute fraction of a revolution. If the number of teeth in the row 17 is less than the number in the row 19, and the number of teeth in the row 21 is made greater than in the row 18, the two relative rotations are in opposite directions and a differential reduction effect is produced. The number of teeth in the rows 18 and 21 is made less than the number of teeth in the rows 17 and 19 so that the reverse relative rotation is different from the forward relative rotation. The diameters of the smaller-diameter rows of teeth are made as close to the diameters of the larger-diameter rows of teeth as possible in the cases where very large speed reductions are desired, so that the relative rotation in one direction is a large fraction of the relative rotation in the other direction, and the differential rotation, the rotation of the output shaft 15, is a small fraction of the rotation of the wobble gear 13. The latter, in turn is a small fraction of the rotation of the input effect. This results in a very minute fractional rotation of the shaft 15 for each cycle of alternating current or other effect producing a nutation of the wobble gear 13. Thus, with the larger diameter rows of teeth having 100 and 101 teeth, respectively, and the smaller diameter rows of teeth having a number of the order of 100 and 99, for example, a gear ratio of 1:10,000 may be obtained.

The ratio between the number of nutations made by the wobble gear 13 and the number of revolutions made by the terminal gear 12 is expressed by the equation:

$$R = 1 - \frac{N_{17}}{N_{19}} \times \frac{N_{21}}{N_{18}}$$

where $N_{17}$, $N_{19}$, $N_{21}$ and $N_{18}$ are the numbers of teeth in the rows of teeth 17, 19, 21 and 18, respectively. Accordingly, for the illustrative number of teeth stated the reduction is $$R = 1 - \frac{99}{100} \times \frac{101}{100} = 1 - \frac{9,999}{10,000} = \frac{1}{10,000}$$

Figure 6:
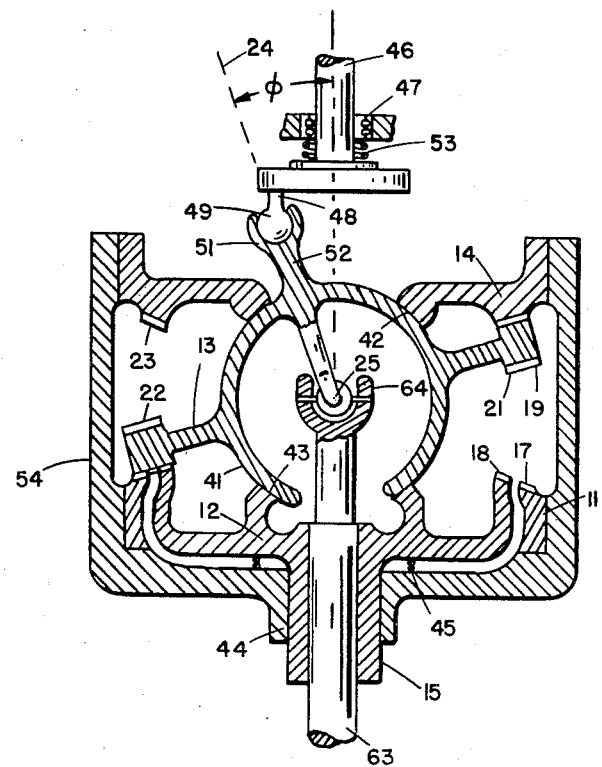
Fig. 6 is a longitudinal sectional view of a modified embodiment of the apparatus of Figs. 1-5 wherein mechanical driving means are employed for effecting nutation instead of electromagnetic translating means.

A form of mechanical drive for producing nutation of the wobble gear 13 is illustrated in Fig. 6, wherein the wobble gear 13 is provided with a spherical journal 41 preferably hollow for the sake of lightness, adapted to rest in one direction against spherical seats 42 formed in the anchor gear 14 and in the opposite direction against spherical seats 43 formed in the terminal gear 12. The shaft 15, shown as hollow in this embodiment, is mounted in a sleeve bearing, or the like, 44 and suitable means, such as end thrust bearings or collar backed coil spring means 45 are provided for pressing the terminal gear 12 against the spherical journal 41 to assure firm contact between the rows of teeth 18 and 21.

In the arrangement of Fig. 6, there is an input shaft 46 constituting the driving means mounted in a suitable bearing 47 and carrying an eccentric 48. Suitable connections are provided between the eccentric 48 and the wobble bearing journal 41. For example, as illustrated, a ball and socket connection may be employed comprising a ball 49 secured to the eccentric 48 and a socket 51 secured to the journal 41 formed in the end of a pin or neck 52 coaxial with the axis of symmetry of the wobble gear 13.

Owing to the fact that the spherical seat 42 and the spherical journal 41 locate the position of the wobble gear 13 along the axes of the anchor gear 11 and the terminal gear 12, the rows of teeth 17 and 19 are held in firm engagement to avoid backlash. However, if desired, an end thrust bearing or a collar-backed spring 53 may also be provided for providing axial pressure of the ball 49 to assure such firm contact between the rows of gear teeth 17 and 19.

It will be apparent that as the shaft 46 and the eccentric 48 rotate, the wobble gear 13 will nutate with successive teeth in rows 19 and 21 coming in contact successively with adjacent teeth in the rows 17 and 18, thereby producing the same mechanical result and greatly reduced speed of rotation of the output shaft 15 as the electromagnetic drive illustrated in the arrangement of Figs. 1–5.

Figure 7:
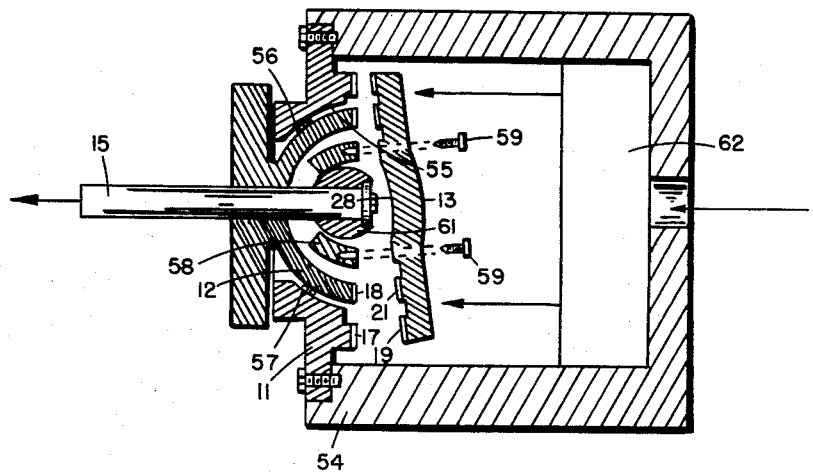
Fig. 7 is a view, partially schematic, of a structural modification of the arrangements of Figs. 1-6.
Figure 8:
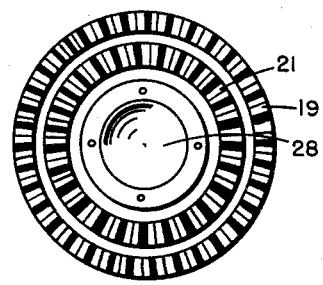
Fig. 8 is a face view of the wobble gear employed in the apparatus of Fig. 7.

Still another method of supporting the wobble gear 13 and insuring its nutation about the point 25 is illustrated in Fig. 7. In this embodiment, a housing 54 is provided to which the anchor gear 11 is secured. There is an end thrust bearing for the terminal gear 12 taking the form of concave and convex spherical seats 55 and 56, respectively, cooperating with ball bearings 57 in suitable ball races (not shown). A hollow spherical retainer member 58 is provided for supporting the wobble gear 13 by means of cap screws 59. To provide a limit stop for the member 58, an ellipsoidal collar member 61 is secured to the inner end of the shaft 15. A suitable actuator 62, illustrated schematically, is provided for causing nutation of the wobble gear 13.

If desired, outputs of two different speeds may be obtained by providing an inner shaft 63, as illustrated in Fig. 6, connected by a suitable universal joint 64 to the journal 41 of the wobble gear 13.

Although the invention has been described and illustrated in detail, it is to be clearly understood that the same is by way of illustration and example only and is not to be taken away by way of limitation, the spirit and scope of this invention being limited only by the terms of the appended claims.

I claim:

1. In combination, first and second gears with rows of teeth thereon and wobble gear means with first and second rows of teeth thereon in meshing engagement with said first and second gears, respectively, for causing one to be driven in relation to the other, said wobble gear means comprising a radially magnetized portion, and means for generating a rotating magnetic field coacting with said radially magnetized portion to effect nutation of said wobble gear means.

2. A speed reducer comprising in combination a fixed anchor gear with a row of teeth, a rotatable terminal gear of different diameter from the anchor gear with a row of teeth thereon, a wobble gear mounted with an axis capable of tilting and with first and second concentric circular rows of teeth thereon, the first row corresponding in diameter to the anchor gear and being arranged to mesh with teeth thereon, and the second row corresponding in diameter to the terminal gear and being arranged to mesh therewith, the number of teeth on the anchor gear differing by small number relatively from the number on the first row of teeth on the wobble gear, and the number of teeth on the terminal gear differing by a small number relatively from the number on the second row of teeth of the wobble gear said wobble gear being formed with a web portion comprising high coercive force permanent magnet material radially magnetized so that the center thereof is of one polarity and the periphery thereof is of another polarity, and a polyphase alternating-current field winding surrounding the wobble gear having terminals for connection to a source of polyphase alternating current, the winding being a two-pole winding for producing a single nutation of the wobble gear for each cycle of alterating current.

3. In combination first and second gears with rows of teeth thereon, a wobble gear with first and second rows of teeth in meshing engagement with said first and second gears respectively, for causing one to be driven in relation to the other, the wobble gear being formed with a web portion comprising high-coercive force permanent-magnet material radially magnetized so that the center thereof is of one polarity and the periphery thereof is of another polarity, and a polyphase alternating-current field winding surrounding the wobble gear having terminals for connection to a source of polyphase alternating current, for producing a nutation of the wobble gear for each cycle of alternating current.

4. In combination first and second gears having rows of teeth thereon and wobble gear means comprising first and second rows of teeth for meshing engagement with said first and second gears, respectively, for causing one to be driven in relation to the other, means for effecting nutation of said wobble gear means, one of said gears having a hollow shaft, an inner shaft rotatably mounted within said hollow shaft and a universal joint connecting said inner shaft to the wobble gear.

5. In combination first and second gears having rows of teeth thereon and wobble gear means with first and second rows of teeth in meshing engagement with said first and second gears, respectively, for causing one to be driven in relation to the other, the wobble gear being formed with a depression, one of said gears having a shaft with an inner end extending therethrough toward the wobble gear, a hollow retainer surrounding the inner end of said shaft with means for securing the retainer to the wobble gear, and a curved surface collar secured to the inner end of said shaft within said hollow retainer for limiting axial motion of the wobble gear with respect to said shaft while permitting nutation thereof.

6. A speed reducer comprising in combination an anchor gear with a row of teeth, a rotatable terminal gear with a row of teeth thereon, a wobble gear with an axis capable of tilting and with first and second concentric circular rows of teeth thereon, the first row being arranged to mesh with teeth on the anchor gear and the second row being arranged to mesh with teeth on the terminal gear, the teeth of each gear tapering and being so formed and spaced as to conform to the shape of the spaces between the teeth of the gear designed to mesh therewith, with the notch at the base of a pair of adjacent teeth deeper than the tip of a tooth of the mating gear meshing therewith when the said tooth is in direct contact with the surfaces of the pair of teeth with which it meshes, and mechanism for effecting nutation of the wobble gear and firmly pressing the meshing portion of the rows of teeth of the wobble gear against the anchor and terminal gear teeth meshing therewith continuously for continuously producing direct contact of each engaged tooth on both sides thereof with the surfaces of adjacent teeth of the mating gear for overcoming backlash, the number of teeth on one of the rows of the wobble gear differing by a small number relatively from the number of teeth of the gear meshing therewith, said nutation effecting mechanism comprising a radially magnetized armature fixed for motion with said wobble gear, and means for generating a rotating magnetic field in and about said armature.

7. A speed reducer comprising in combination an anchor gear with a row of teeth, a rotatable terminal gear with a row of teeth thereon, a magnetized wobble gear with an axis capable of tilting and with first and second concentric circular rows of teeth thereon, the first row being arranged to mesh with teeth on the anchor gear and the second row being arranged to mesh with teeth on the terminal gear, the teeth of each gear tapering and being so formed and spaced as to conform to the shape of the spaces between the teeth of the gear designed to mesh therewith, with a notch at the base of a pair of adjacent teeth deeper than the tip of a tooth of the mating gear meshing therewith when the said tooth is in direct contact with the surfaces of the pair of teeth with which it meshes, and a winding structure adjacent the wobble gear for generating a rotating magnetic field having a component in the axial direction for effecting nutation of the wobble gear and firmly pressing the meshing portion of the rows of teeth of the wobble gear resiliently against the anchor and terminal gear teeth meshing therewith continuously for continuously producing direct contact of each engaged tooth on both sides thereof with the surfaces of adjacent teeth of the mating gear for overcoming backlash, the number of teeth on one of the rows of the wobble gear differing by a small number relatively from the number of teeth of the gear meshing therewith.

References Cited in the file of this patent

OTHER REFERENCES

| | | |
|---|---|---|
| Re. 22,549 | Plensler | Sept. 26, 1944 |
| 9,914 | Dibben et al. | Aug. 9, 1853 |
| 211,894 | Dutton | Feb. 4, 1879 |
| 526,413 | Rushton | Sept. 25, 1894 |
| 959,394 | Salomo | May 24, 1910 |
| 1,263,008 | Williams | Apr. 16, 1918 |
| 1,642,815 | Kirner | Sept. 20, 1927 |